(12) United States Patent
Kim et al.

(10) Patent No.: US 8,995,581 B2
(45) Date of Patent: Mar. 31, 2015

(54) APPARATUS AND METHOD FOR SOFT DEMAPPING

(75) Inventors: Kyeong Yeon Kim, Hwaseong-si (KR); Ki Taek Bae, Hwaseong-si (KR); Ho Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 13/468,454

(22) Filed: May 10, 2012

(65) Prior Publication Data

US 2012/0288039 A1 Nov. 15, 2012

(30) Foreign Application Priority Data

May 11, 2011 (KR) .......................... 10-2011-0043990
Mar. 22, 2012 (KR) .......................... 10-2012-0029332

(51) Int. Cl.
*H04L 27/38* (2006.01)

(52) U.S. Cl.
CPC .................................. *H04L 27/3845* (2013.01)
USPC ........... 375/341; 375/316; 375/340; 375/346; 375/259; 375/260; 375/261; 375/262

(58) Field of Classification Search
None
See application file for complete search history.

(56) References Cited

U.S. PATENT DOCUMENTS

| | | | | |
|---|---|---|---|---|
| 5,315,619 A * | 5/1994 | Bhatt | ............................. | 375/340 |
| 6,175,591 B1 * | 1/2001 | Iwamatsu | ..................... | 375/232 |
| 6,236,263 B1 * | 5/2001 | Iwamatsu | ..................... | 329/306 |
| 8,279,980 B1 * | 10/2012 | Lee et al. | ....................... | 375/340 |
| 8,526,543 B2 * | 9/2013 | Chrabieh et al. | .............. | 375/324 |
| 2004/0123224 A1 * | 6/2004 | Colombo et al. | ............. | 714/781 |
| 2006/0133533 A1 * | 6/2006 | Khandekar et al. | .......... | 375/279 |
| 2006/0203943 A1 * | 9/2006 | Scheim et al. | ................ | 375/341 |
| 2007/0127608 A1 * | 6/2007 | Scheim et al. | ................ | 375/346 |
| 2008/0260068 A1 * | 10/2008 | Seyedi-Esfahani | ........... | 375/298 |
| 2008/0298452 A1 * | 12/2008 | Sampath et al. | .............. | 375/232 |
| 2009/0086808 A1 * | 4/2009 | Liu et al. | ...................... | 375/233 |
| 2009/0161799 A1 * | 6/2009 | Fisher-Jeffes | ................. | 375/341 |
| 2009/0199076 A1 * | 8/2009 | Boer et al. | .................... | 714/799 |
| 2010/0027727 A1 * | 2/2010 | Kelley | ......................... | 375/346 |
| 2010/0202386 A1 * | 8/2010 | Takaoka et al. | ............... | 370/329 |
| 2012/0307942 A1 * | 12/2012 | Bae et al. | ...................... | 375/320 |
| 2013/0223502 A1 * | 8/2013 | Tabet et al. | ................... | 375/227 |

FOREIGN PATENT DOCUMENTS

| | | |
|---|---|---|
| JP | 2009-055217 A | 3/2009 |
| KR | 10-2009-0065964 A | 6/2009 |
| KR | 10-2009-0071857 A | 7/2009 |
| KR | 10-2010-0046967 A | 5/2010 |

OTHER PUBLICATIONS

Meng Li, Charbel Abdel Nour, Christophe Jego and Catherine Douillard, "Design of Rotated QAM Mapper/Demapper for the DVB-T2 Standard", IEEE 2009.*

Meng Li, Charbel Abdel Nour, Christophe Jégo, Jianxiao Yang and Catherine Douillard, Efficient Iterative Receiver for Bit-Interleaved Coded Modulation According to the DVB-T2 Standard, IEEE 2011.*

* cited by examiner

*Primary Examiner* — Siu Lee
(74) *Attorney, Agent, or Firm* — NSIP Law

(57) ABSTRACT

Provided are a soft demapping apparatus and method that may cancel interference included in a rotated quadrature amplitude modulation (QAM) signal, using at least one interference cancellation unit, and may perform one-dimensional (1D) soft demapping of the interference-cancelled rotated QAM signal.

15 Claims, 6 Drawing Sheets

APPARATUS AND METHOD FOR SOFT DEMAPPING

CROSS-REFERENCE TO RELATED APPLICATION(S)

This application claims the benefit under 35 USC §119(a) of Korean Patent Application No. 10-2011-0043990, filed on May 11, 2011, and Korean Patent Application No. 10-2012-0029332, filed on Mar. 22, 2012, both of which were filed in the Korean Intellectual Property Office, the entire disclosures of which are incorporated herein by reference for all purposes.

BACKGROUND

1. Field

The following description relates to a soft demapping apparatus for a system using a signal space diversity (SSD) scheme.

2. Description of Related Art

Research is being conducted on signal space diversity (SSD) for improving a bit error rate (BER) in a fading channel.

To obtain the SDD, a quadrature amplitude modulation (QAM) signal may be transmitted by rotating the QAM signal and by interleaving an in-phase (I) channel and a quadrature (Q) channel with respect to each other. In this example, a transmission signal of the I channel and a transmission signal of the Q channel may have different channel gains such that a receiver may obtain a diversity.

In particular, the receiver may obtain a significant performance gain in an erasure channel in which one of the I channel and the Q channel is erased, or in a zero decibel (dB) echo channel.

As a simple interleaving method, a rotated or tilted QAM signal having a Q channel delay may be used. This method has been adopted and employed as a standard in a digital broadcasting system and the like.

However, in such system, due to the rotation, a correlation may occur between the I channel and the Q channel. Accordingly, an amount of calculations of a soft demapper, for example, an amount of log likelihood ratio (LLR) calculations may be increased.

When the receiver uses a maximum likelihood (ML) scheme, two pulse amplitude modulations (PAMs) may be regarded as being received because the I channel and the Q channel are independent from each other in a non-rotated QAM. For example, in the case of $2^m$ QAMs, $2 \times 2^{2/m}$ one-dimensional (1D) LLR calculations may be used.

Also in this example, a distance corresponding to $2^m$ may be used. Accordingly, in the case of a high modulation, a receiver may use most of the calculation amounts for a soft demapping algorithm. Because of the different channel gains between the I channel and the Q channel, a two-dimensional (2D) Euclidian distance calculation and the number of Euclidian distance calculations corresponding to the number of signals may be used to calculate an LLR.

Accordingly, a soft demapping algorithm using fewer calculations may be desired to decrease the complexity of the receiver. Even though max-log approximation is proposed to decrease the complexity of the receiver, the amount of 2D distance calculations may correspond to the number of full search rotated signals.

Methods for dividing a region into sub-regions have been proposed to decrease an amount of calculations, and thus, an amount of calculations with respect to the full search has significantly decreased. However, in the case of high modulation, a significantly large amount of calculations are still required and degradation in performance to the full search may occur.

SUMMARY

In an aspect, provided is an apparatus for soft demapping, the apparatus including a receiver configured to receive a rotated quadrature amplitude modulation (QAM) signal, at least one interference cancellation unit configured to cancel interference that is included in the rotated QAM signal, and a demapping processing unit configured to perform one-dimensional (1D) soft demapping on the interference-cancelled rotated QAM signal.

The demapping processing unit may be configured to calculate a log likelihood ratio (LLR) using one dimension, based on the interference-cancelled rotated QAM signal and a corresponding signal-to-interference-plus-noise-ratio of the interference-cancelled rotated QAM signal.

The rotated QAM signal may correspond to a signal that is modulated to an in-phase (I) signal and a quadrature (Q) signal which are mapped using a constellation having at least one data bit, and in which the modulated I signal and Q signal are rotated or tilted at a predetermined angle.

The receiver may be configured to receive the I signal via an I channel and to receive the Q signal via a Q channel, and to compensate for the I channel and the Q channel using estimated channel information.

The apparatus may further comprise a determining unit configured to determine a signal that has a channel gain above a threshold between signals of the I channel and the Q channel.

The interference cancellation unit may be configured to perform linear interference cancellation with respect to the signal having the channel gain above the threshold, and to perform non-linear interference cancellation by determining a transmission symbol of the linear interference-cancelled signal and by removing the determined transmission symbol from a received symbol, and the demapping processing unit may be configured to perform 1D demapping of the interference-cancelled signal.

The threshold may correspond to a reference value that is used to determine reliability of each of the I channel and the Q channel.

The determining unit may be configured to select one of the at least one interference cancellation units based on the channel gain with respect to the I channel and the Q channel.

The selected interference cancellation unit may be configured to perform linear interference cancellation with respect to a signal of the channel having the channel gain above the threshold, and to perform non-linear interference cancellation with respect to a signal of a channel having a channel gain below the threshold by determining a transmission symbol of the linear interference-cancelled signal and by removing the determined transmission symbol from a received symbol, and the demapping processing unit may be configured to perform 1D demapping of the rotated QAM signal using the channel having the channel gain above the threshold.

In response to the channel gain of the I channel and the channel gain of the Q channel both being above the threshold or both being below the threshold, the selected interference cancellation unit may be configured to cancel interference in the rotated QAM signal using a linear interference cancellation unit.

In response to both the channel gain of the I channel and the channel gain of the Q channel being above the threshold or being below the threshold, the selected interference cancellation unit may be configured to cancel primary interference in the rotated QAM signal using a linear interference cancellation unit, and to cancel secondary interference in the primary interference-cancelled rotated QAM signal using a nonlinear interference cancellation unit, and the demapping processing unit may be configured to perform 1D demapping of the secondary interference-cancelled rotated QAM signal.

In response to both the channel gain of the I channel and the channel gain of the Q channel having a value within the same range, the selected interference cancellation unit may be configured to cancel interference in the rotated QAM signal using each of a linear interference cancellation unit and a non-linear interference cancellation unit, and the demapping processing unit may be configured to perform 1D demapping of the rotated QAM signal in which interference is cancelled using each of the linear interference cancellation unit and the non-linear interference cancellation unit, through linear combination.

In an aspect, there is provided a method for soft demapping, the method including receiving a rotated quadrature amplitude modulation (QAM) signal, cancelling interference included in the rotated QAM signal using at least one interference cancellation unit, and performing one-dimensional (1D) soft demapping on the interference-cancelled rotated QAM signal.

The performing may comprise calculating a log likelihood ratio (LLR) using one dimension, based on the interference-cancelled rotated QAM signal and a corresponding signal-to-interference-plus-noise-ratio of the interference-cancelled rotated QAM signal.

The rotated QAM signal may correspond to a signal that is modulated to an in-phase (I) signal and a quadrature (Q) signal which are mapped using a constellation having at least one data bit, and in which the modulated I signal and Q signal are rotated or tilted at a predetermined angle.

The method may further comprise determining a signal having a channel gain above a threshold between signals of the I channel and the Q channel.

The determining may comprise selecting one of the at least one interference cancellation units based on the channel gain with respect to the I channel and the Q channel.

In an aspect, there is provided a computer-readable storage medium comprising a program for instructing a computer to perform a method for soft demapping, the method including receiving a rotated quadrature amplitude modulation (QAM) signal, cancelling interference included in the rotated QAM signal using at least one interference cancellation unit, and performing one-dimensional (1D) soft demapping on the interference-cancelled rotated QAM signal.

Other features and aspects will be apparent from the following detailed description, the drawings, and the claims.

Figure 1:
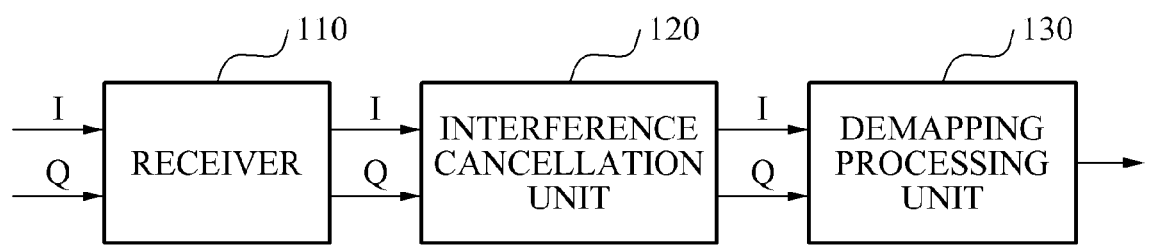
FIG. 1 is a diagram illustrating an example of a soft demapping apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED-DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Described herein is technology that may decrease a calculation amount of a rotated QAM soft demapper to a calculation amount of a soft demapper for a non-rotated QAM signal FIG. 1 illustrates an example of a soft demapping apparatus. The soft demapping apparatus may be or may be included in a terminal, for example, a computer, a smart phone, a tablet, an appliance, a sensor, and the like.

Referring to FIG. 1, the soft demapping apparatus includes a receiver 110 that may receive a rotated quadrature amplitude modulation (QAM) signal, at least one interference cancellation unit 120 that may cancel interference in the rotated QAM signal, and a demapping processing unit 130 that may perform one-dimensional (1D) soft demapping of the interference-cancelled rotated QAM signal. In various examples herein, "to cancel interference" may refer to the removal of some or all of the interference in a signal.

For example, the demapping processing unit 130 may calculate a log likelihood ratio (LLR) using one dimension, based on the interference-cancelled rotated QAM signal and a corresponding signal-to-interference-plus-noise-ratio of the interference-cancelled rotated QAM signal. The rotated QAM signal may be a signal that is demodulated to an in-phase (I) signal and a quadrature (Q) signal which are mapped using a constellation having at least one data bit, and in which the modulated I signal and Q signal are rotated or tilted at a predetermined angle.

The receiver 110 may receive the I signal via an I channel and may receive the Q signal via a Q channel. For example, the receiver 110 may compensate for the I channel and/or the Q channel using estimated channel information.

In some examples, the soft demapping apparatus may further include a determining unit to determine a signal that has a relatively great channel gain between signals of the I channel and the Q channel, or to determine a channel gain level based on a predetermined threshold. As described in various examples, the term relatively great channel gain corresponds to a channel gain that is at or above a threshold value.

Figure 2:
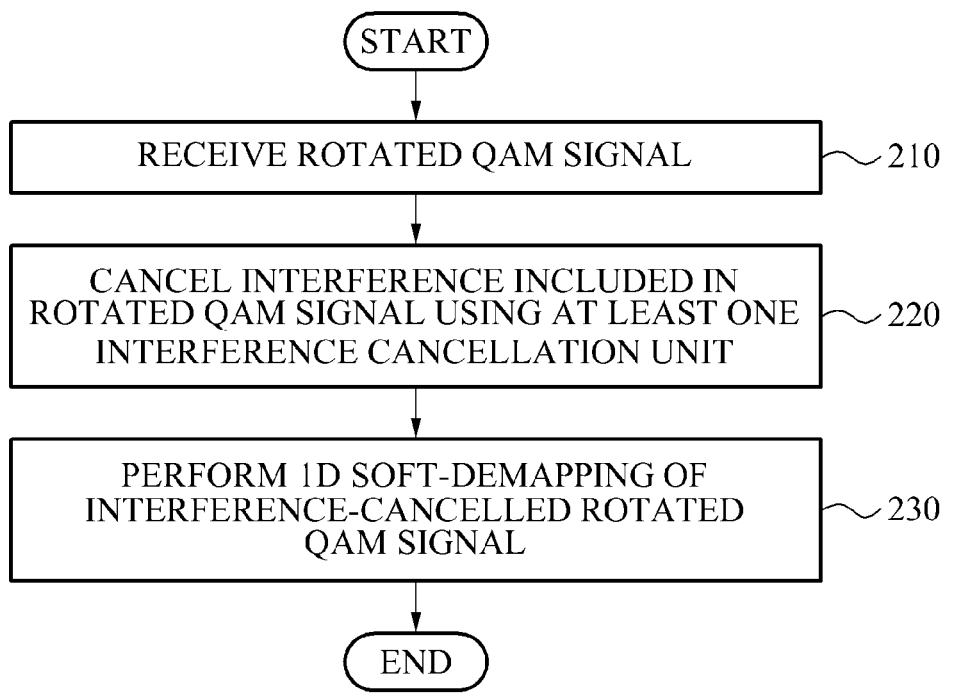
FIG. 2 is a flowchart illustrating an example of a soft demapping method.

FIG. 2 illustrates an example of a soft demapping method.

Referring to FIG. 2, a rotated QAM signal is received in 210. In 220, interference included in the rotated QAM signal is canceled using at least one interference cancellation unit. For example, a predetermined interference cancellation unit may be used to cancel interference and may be selected from various interference cancellation units based on a predetermined threshold.

As an example, the threshold may indicate a reference value that is used to compare the reliability of an I channel and a Q channel, respectively. For example, the reliability may be compared using a signal to interference plus noise ratios (SINRs) of the I channel and the Q channel, a reference value used to identify an erasure channel from the I channel and the Q channel, and the like. In this example, at least one interference cancellation unit 120 may be selected based on the channel gain with respect to the I channel and the Q channel using a determining unit.

In 230, demapping of the interference-cancelled rotated QAM signal is performed, for example, using the demapping processing unit 130.

For example, a determining unit may determine the signal having the relatively great channel gain between signals of the I channel and the Q channel. In this example, the soft demapping apparatus may perform linear interference cancellation with respect to the signal having the relatively great channel gain, and perform non-linear interference cancellation by determining a transmission symbol of the linear interference-cancelled signal and by removing the determined transmission symbol from a received symbol, using the at least one interference cancellation unit 120.

In this example, the demapping processing unit 130 may perform 1D demapping of the interference-cancelled signal. A channel having a relatively high channel gain may be selected from between the I channel and the Q channel. For example, the soft demapping apparatus may perform a primary soft demapping based on reliability of a signal and a PAM signal after cancelling interference only in a signal of the channel having the relatively high channel gain.

By employing an interference cancellation unit for determining a transmission symbol from the interference-cancelled signal of the channel having the relatively high channel gain and removing the determined transmission signal from a received signal and then performing channel equalization, the soft demapping apparatus may perform soft demapping of a transmission symbol corresponding to a channel having a relatively low channel gain. In this example, a hard decision and a soft decision may be used to determine the transmission symbol.

The demapping processing unit 130 may perform 1D LLR calculation based on the interference-cancelled rotated QAM signal, for example, two PAM signals and a corresponding signal-to-interference-plus-noise-ratio of each interference-cancelled signal.

The demapping processing unit 130 may perform 1D LLR calculation using, as input values, two PAM signals $\hat{x}=[\hat{x}_I, \hat{x}_Q]^T$ in which I and Q channels are identified through the interference cancel units 120. For example, the 1D LLR calculation may be pre-performed and then be stored in a table, and a normalized LLR value may be calculated using the table. A 1D table may be used like in a non-rotated QAM and thus, may reflect a piecewise linear LLR value.

For example, the demapping processing unit 130 may perform scaling of the normalized LLR value that is pre-calculated using, as input values, soft scaling values $\beta_I$ and $\beta_Q$ corresponding to an SINR after interference cancellation and thereby may obtain a final LLR value.

Hereinafter, an example of a process of selecting at least one interference cancellation unit from among various interference cancellation units to thereby cancel interference in a QAM signal and perform demapping is described.

Figure 3:
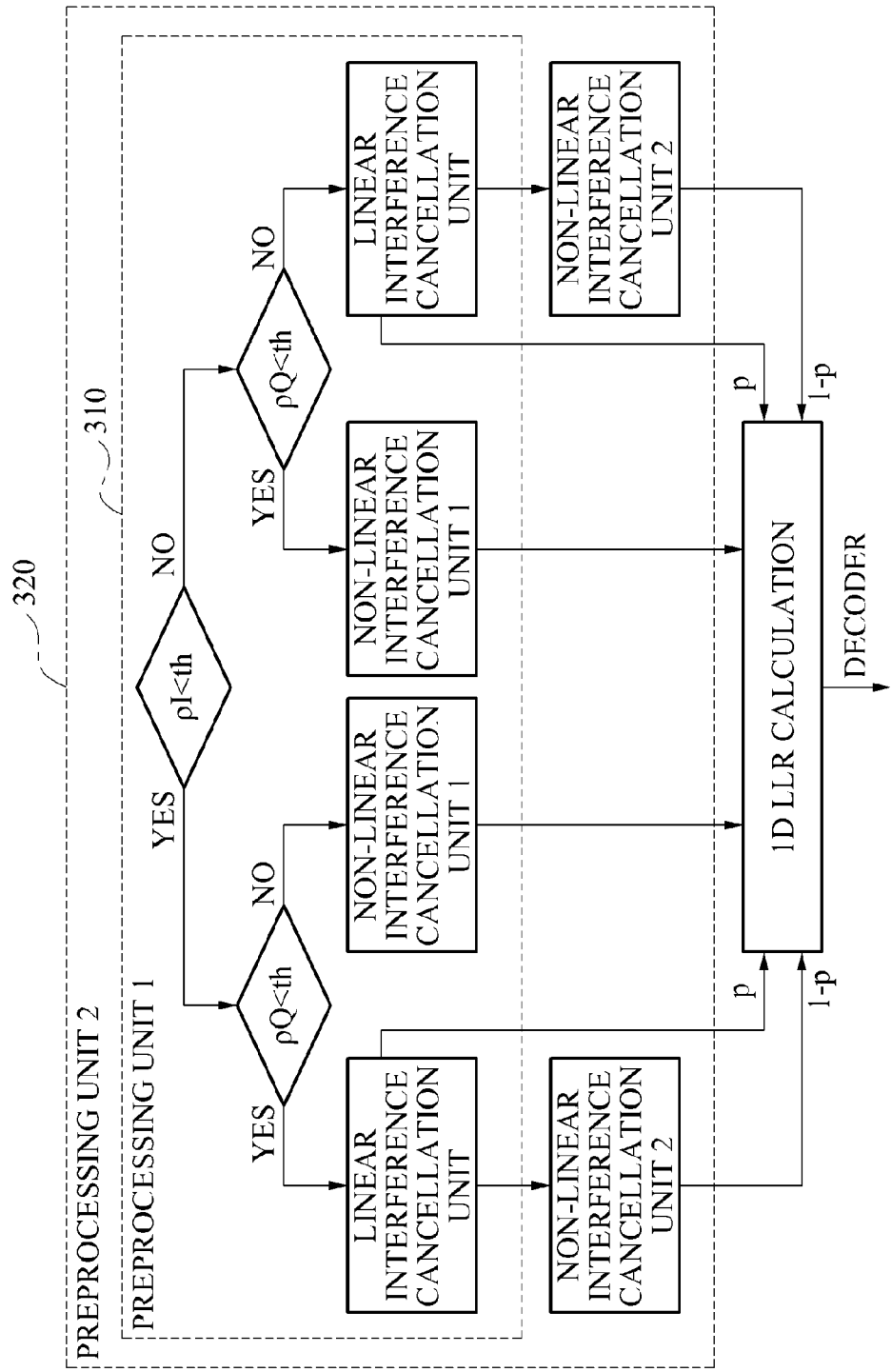
FIG. 3 is a flowchart illustrating another example of a soft demapping method.

FIG. 3 illustrates another example of a soft demapping method.

The soft demapping apparatus may determine a transmission symbol in a one-dimensional level and remove the transmission symbol using only one channel that has a relatively high channel gain between two channels, for example, ($\rho I$, $\rho Q$), and may calculate an LLR using the selected channel.

For example, a channel having a relatively high channel gain may be selected from between the I channel and the Q channel by the determining unit. A selected interference cancellation unit 120 may perform linear interference cancellation with respect to a signal of the channel having the relatively high channel gain and may perform non-linear interference cancellation with respect to a signal of a channel having a relatively low channel gain. The non-linear interference cancellation may be performed by determining a transmission symbol of the linear interference-cancelled signal and by removing the determined transmission symbol from a received symbol. The demapping processing unit 130 may perform one-dimensional demapping of the rotated QAM signal using the channel having the relatively high channel gain.

If only one channel has an excellent channel gain between the I channel and the Q channel, the soft demapping apparatus may calculate LLR values corresponding to the I channel and the Q channel by performing interference cancellation with respect to the channel having the excellent channel gain.

By employing a non-linear interference cancellation unit during the above process, the soft demapping apparatus may perform LLR calculation as shown in Table 1.

TABLE 1

Input
case 1: ($\rho_I \geq$ th and $\rho_Q <$ th): $\tilde{r}_i = r_I/\rho_I$ and $\theta$
case 2: ($\rho_I <$ th and $\rho_Q \geq$ h): $\tilde{r}_Q = r_Q/\rho_Q$ and $\theta$
Decision of $\hat{x}_I$ or $\hat{x}_Q$
case 1: decide $\hat{x}_I$ with hard decision (i.e., the nearest point from $\tilde{r}_I$)
or soft decision
case 2: decide $\hat{x}_Q$ with hard decision (i.e., the nearest point from $\tilde{r}_Q$)
or soft decision
Interference Cancellation
case 1: $\tilde{r}_Q = (\tilde{r}_I - g_{ii}\hat{x}_I)/g_{iq}$ where $g_{ii} = \cos\theta$, $g_{iq} = -\sin\theta$
case 2: $\tilde{r}_I = (\tilde{r}_Q - g_{qq}\hat{x}_Q)/g_{qi}$ where $g_{qq} = \cos\theta$, $g_{qi} = \sin\theta$
Output $\tilde{r}_I$ and $\tilde{r}_Q$ As another example, if both the channel gain of the I channel and the channel gain of the Q channel are high or low, that is, if both the channel gain of the I channel and the Q channel are high or if both the channel gain of the I channel and the Q channel are low, the soft demapping apparatus may cancel interference using a linear interference cancellation unit and may calculate an LLR value.

For example, if both the channel gain of the I channel and the channel gain of the Q channel are high or low, the interference cancellation unit 120 may cancel interference in the rotated QAM signal using the linear interference cancellation unit, and may calculate the LLR value using the interference-cancelled rotated QAM signal.

Referring to FIG. 3, if both the channel gain of the I channel and the channel gain of the Q channel are high or low, the soft demapping unit may calculate the LLR value as shown in Table 2, using a preprocessing unit (1) 310 including the linear interference cancellation unit.

Input
$\tilde{r}_I = r_I/\rho_I$, $\tilde{r}_Q = r_Q/\rho_Q$ and $\theta$
De-rotation $$\begin{bmatrix} \overline{r}_I \\ \overline{r}_Q \end{bmatrix} = \begin{bmatrix} \cos\theta & -\sin\theta \\ \sin\theta & \cos\theta \end{bmatrix} \begin{bmatrix} \tilde{r}_I \\ \tilde{r}_Q \end{bmatrix}$$

Output $\overline{r}_I$ and $\overline{r}_Q$

Input
$r_I \cdot r_Q \cdot \tilde{r}_I \cdot \tilde{r}_Q \cdot \rho_I \cdot \rho_Q$ and $\theta$
Decision of $\hat{x}_I$ and $\hat{x}_Q$
decide $\hat{x}_I$ with hard decision (i.e.. the nearest point from $\tilde{r}_I$) or soft decision
decide $\hat{x}_Q$ with hard decision (i.e.. the nearest point front $\tilde{r}_Q$) or soft decision
De-rotation and normalization $$\begin{bmatrix} \tilde{\tilde{r}}_I \\ \tilde{\tilde{r}}_Q \end{bmatrix} = \begin{bmatrix} 1/\rho_I & 0 \\ 0 & 1/\rho_Q \end{bmatrix} \begin{bmatrix} \cos\theta & -\sin\theta \\ \sin\theta & \cos\theta \end{bmatrix} \begin{bmatrix} \tilde{r}_I \\ \tilde{r}_Q \end{bmatrix} \triangleq \begin{bmatrix} g_{ii}x_I + g_{iq}x_Q + \tilde{w}_I \\ g_{qi}x_I + g_{qq}x_Q + \tilde{w}_Q \end{bmatrix}$$

Interference Cancellation
$\tilde{r}_I = (\tilde{r}_I - g_{qi}\hat{x}_Q)/g_{ii}$
$\tilde{r}_Q = (\tilde{r} - g_{iq}\hat{x}_I)/g_{qq}$
Output $p \cdot \tilde{r}_I + (1-p) \cdot \tilde{r}_I$ and $p \cdot \tilde{r}_Q + (1-p) \cdot \tilde{r}_Q$ where $0 \le p \le 1$ As another example, if the channel gain of the I channel and the channel gain of the Q channel have a similar value, for example, values within a predetermined range of values, the soft demapping apparatus may perform interference cancellation using both the linear interference cancellation unit and the non-linear interference cancellation unit, and may perform linear combination and demapping.

For example, if both the channel gain of the I channel and the channel gain of the Q channel have a value within the same range, the interference cancellation unit 120 may cancel interference in the rotated QAM signal using each of the linear interference cancellation unit and the non-linear interference cancellation unit. The demapping processing unit may calculate the LLR value by performing ID demapping of the rotated QAM signal in which interference is cancelled using each of the linear interference cancellation unit and the non-linear interference cancellation unit, through linear combination.

In the case of the preprocessing unit (2) 320, the soft demapping apparatus may de-rotate a rotated QAM signal and normalize the de-rotated QAM signal by sequentially employing the linear interference cancellation unit and the non-linear cancellation unit, thereby decreasing an SINR in comparison to simply using a received signal.

If a channel gain is assumed as 1, a threshold may be assumed as 0.01. In this example, proposed soft demapping of FIG. 3 shows 1D LLR values calculated after employing the pre-processing unit (1) 310.

If interference is cancelled using only a single receive channel having a relatively high channel gain, the soft demapping apparatus may calculate an LLR value with a relatively small amount of calculations.

In addition, the soft demapping apparatus may apply a linear interference cancellation unit to an erasure channel and may achieve a gain in a bit error rate (BER) in comparison to a two-dimensional (2D) sub-region based algorithm.

For example, as shown in FIG. 3, parallel interference cancellation (PIC) may be applied for the non-linear interference cancellation unit 2 and two types of linear filers may be employed. For example, a symbol decision used in the PIC may be determined after passing through a zero forcing filter. A received signal for the PIC may use a signal having undergone a de-rotation process.

According to an aspect, in comparison to using only a rotated QAM signal, it is possible to further increase an SINR by de-rotating the rotated QAM signal. The PIC effect may be enhanced by decreasing a difference between a channel gain of an I channel and a channel gain of a Q channel.

Hereinafter, an example of a process of soft demapping using only the preprocessing unit 1 310 for the soft demapping apparatus is described with reference to FIG. 3. In this example, if a threshold further decreases, the soft demapping apparatus may perform only a preprocessing process of linear interference cancellation in a general channel and may obtain the same BER as using 1D table after zero-forcing. Also, if the threshold further decreases, the soft demapping apparatus may enhance a BER through non-linear preprocessing in an erasure channel.

For example, in the case of 64 rotated QAM, using the preprocessing unit (2) 320, an amount of calculations may increase by adding a non-linear interference cancellation unit by one to a general channel. However, in comparison to using the preprocessing (1) 310, a better diversity may be achieved.

In comparison to an LLR calculation based on a 2D sub-region, a relatively smaller amount of calculations may be used and a better BER may be achieved in an erasure channel.

In the case of 256 rotated QAM, throughput proximate to the full search may be achieved using only the preprocessing unit (1) 310.

If a 1D LLR calculation is performed by performing interference cancellation through a preprocessing process, preprocessing may be performed based on a symbol unit. Accordingly, a smaller amount of calculations may be used in a high modulation.

In the case of 64 rotated QAM, using the preprocessing unit (1) 310, an amount of calculations corresponding to a case in which only the linear interference cancellation unit or a smaller amount of calculations may be used.

For example, in the case of 64 QAM, even though the preprocessing unit (2) 320 is employed, six multipliers and one or two dividers may be used.

Figure 4:
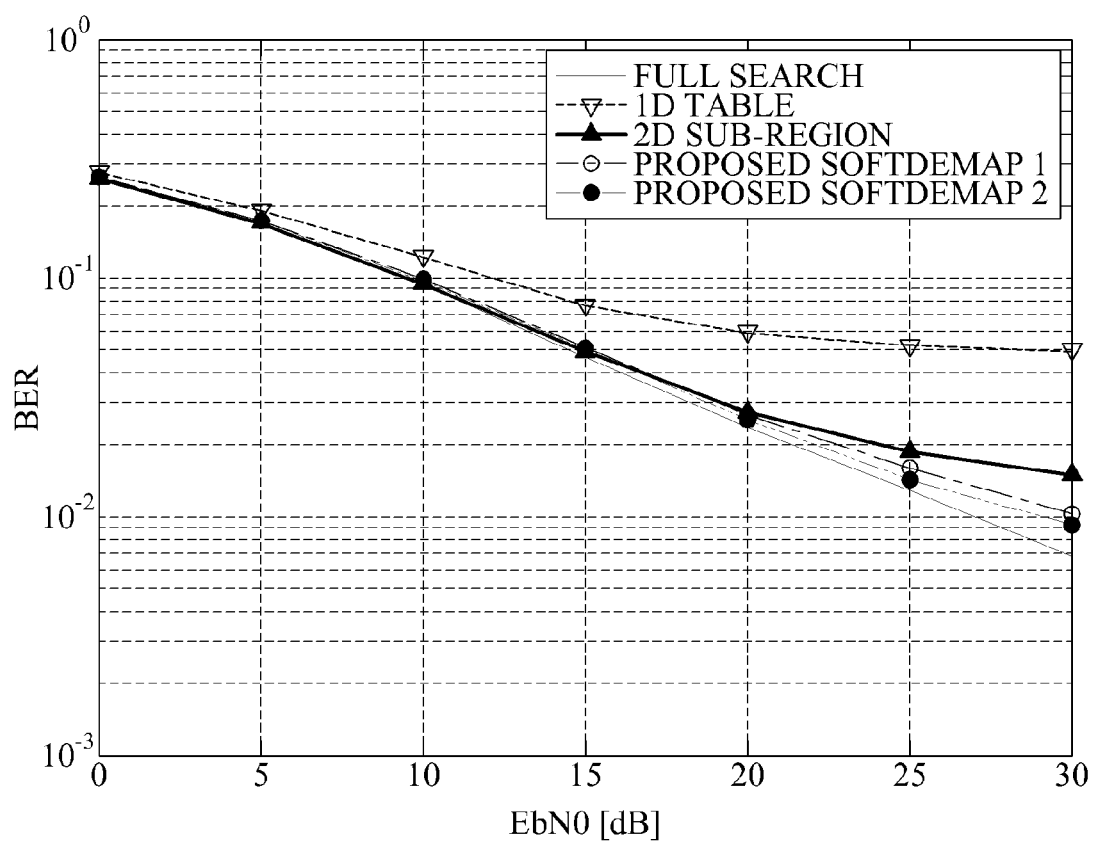
FIG. 4 is a graph illustrating an example of a bit error rate (BER) obtained from log likelihood ratio (LLR) values of 64 quadrature amplitude modulation (QAM).
Figure 5:
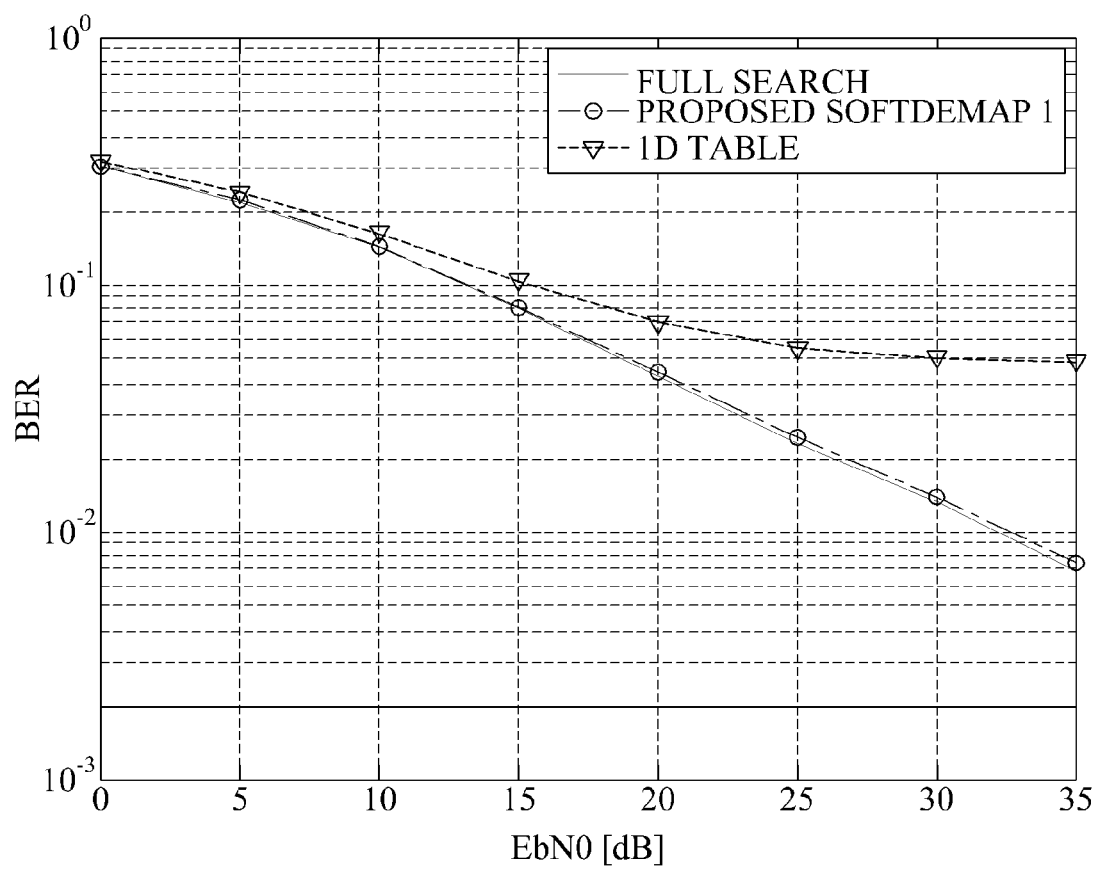
FIG. 5 is a graph illustrating an example of a BER obtained from LLR values of 256 QAM.
Figure 6:
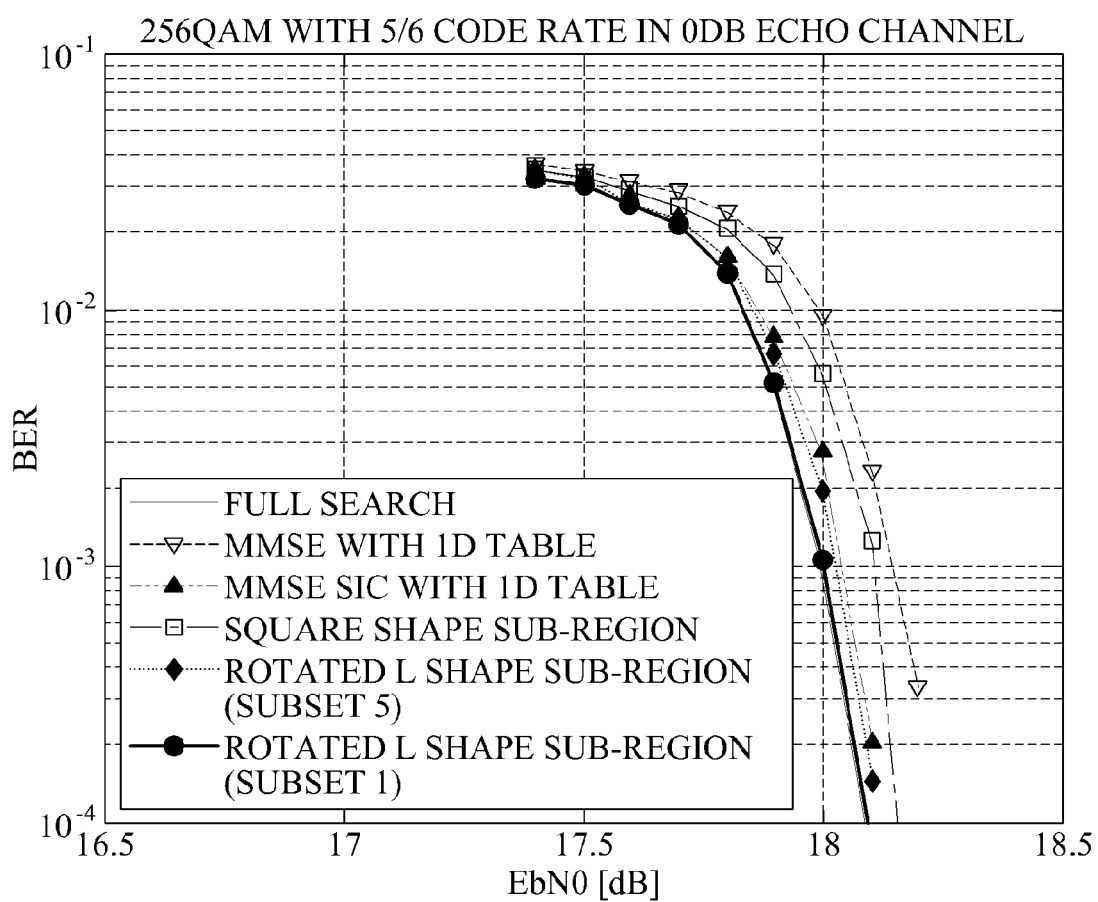
FIG. 6 is a graph illustrating an example of a bit error rate (BER) obtained after using LLR values of 256 QAM as input values of a low density parity check (LDPC) decoder.

FIG. 4 illustrates an example of a graph of a bit error rate (BER) obtained from LLR values of 64 QAM measured through a soft demapping, FIG. 5 illustrates an example of a graph of a BER obtained from LLR values of 256 QAM measured through a soft demapping method, and FIG. 6 illustrates an example of a graph showing a BER obtained after using LLR values of 256 QAM as input values of a low density parity check (LDPC) decoder through a soft demapping method.

An LLR value may be calculated using the soft demapping method. In this example, it is possible to obtain the performance close to the full search as shown in the proposed soft demapping results of FIGS. 4 through 6. Also, in the case of 256 QAM, the LLR value may be calculated using an amount of calculations corresponding to 1% of the full search. For example, to propose an optimal linear interference cancellation method, it is possible to model a received rotated QAM signal using two PAM signals. Here, a channel matrix may be given by the following Equation 1:

$$H \triangleq PQ = \begin{bmatrix} \rho_I & 0 \\ 0 & \rho_Q \end{bmatrix} \begin{bmatrix} \cos\theta & -\sin\theta \\ \sin\theta & \cos\theta \end{bmatrix}, \quad \text{[Equation 1]}$$

In Equation 1, P denotes a diagonal matrix indicating a channel gain, and Q denotes a rotation matrix.

A signal having passed through a zero forcing equalizer may be defined as $\hat{x}_{ZF} \triangleq (H^T H)^{-1} H^T r$ and each interference component may be assumed as Gaussian in Table 2. In this example, an LLR applied with a max-log approximation defined in the following Equation 3 may be preprocessed using a unbiased minimum mean square error (U-MMSE) and be arranged using ID soft demapping. The 1D soft-demapping result may be defined as shown in Equation 2:

$$\Lambda_{MMSE,i}(b_k) = \qquad\qquad\qquad\qquad\text{[Equation 2]}$$

$$\beta_i \left[ \min_{a \in A_{k,i}^0} \left| \frac{\hat{x}_{MMSE,i}}{\gamma_{ii}} - a_i \right|^2 - \min_{a \in A_{k,i}^1} \left| \frac{\hat{x}_{MMSE,i}}{\gamma_{ii}} - a_i \right|^2 \right],$$

$$\hat{x}_{MMSE} = Q^T (P^2 + \sigma_n^2 I)^{-1} P^T r = Q^T \begin{bmatrix} \frac{\rho_I}{\rho_I^2 + \sigma_n^2} r_I \\ \frac{\rho_Q}{\rho_Q^2 + \sigma_n^2} r_Q \end{bmatrix},$$

In Equation 2, $$\Gamma = Q^T (P^2 + \sigma_n^2 I)^{-1} P^2 Q = Q^T \begin{bmatrix} \frac{\rho_I^2}{\rho_I^2 + \sigma_n^2} & 0 \\ 0 & \frac{\rho_Q^2}{\rho_Q^2 + \sigma_n^2} \end{bmatrix} Q.,$$

$$\beta_i \triangleq \frac{\gamma_{ii}}{1 - \gamma_{ii}},$$

and $\gamma_{ii}$ denotes detected signal power.

Subscripts corresponding to I and Q are defined as 1 and 2. In this example, $A_{k,i}^1$ indicates a constellation set in a case where a bit corresponding to $$\left( \frac{k - i}{2} + 1 \right)$$

of a PAM signal is "1".

A signal preprocessed using MMSE may be defined by de-rotation after MMSE for each channel. Accordingly, there may not be a need to obtain an inverse matrix.

An MMSE output value may be normalized by $\gamma_{ii}$ corresponding to an SNR after MMSE and thus, the same effect as U-MMSE may be achieved.

In this example, when calculating an LLR, an unbiased distance may be measured.

A normalized 1D LLR may be configured using a pre-calculated partial linear table, which is described above.

If an interference component is assumed as a Gaussian, U-MMSE may be optimal for a linear interference cancellation unit. However, during rotation or de-rotation, interference from another channel may occur.

According to an aspect, a soft demapping apparatus may add a nonlinear interference cancellation, for example, a successive interference cancellation (SIC) in order to increase an SINR, after performing linear interference cancellation.

After performing linear interference cancellation, a channel having a relatively great SINR may be detected, a transmission symbol may be determined, and the transmission symbol may be removed from a received signal, thereby increasing an SINR of a weak channel.

To increase the SINR of a weak channel, SIC in a multi-user receiver or a multiple input multiple output (MIMO) receiver may be performed. When substantially configuring the above method, it may be difficult to perform a parallel process by selection. However, in the case of a rotated QAM according to an aspect herein, even though a selection order is determined using only SNR comparison of a received signal instead of using an SINR after interference cancellation, the same result may be obtained.

That is, a linear interference cancellation LLR calculation may be initially performed with respect to a signal having a relatively great channel gain.

According to an aspect, a PAM signal value may be determined based on a signal obtained after performing U-MMSE of a signal having a relatively great channel gain, and may be defined as $\bar{a}_1$ or $\bar{a}_2$. Accordingly, a signal of an initially selected channel may be removed from received signals.

In the case of a remaining unselected channel, an LLR after interference cancellation may be defined again as shown in Equation 3:

$$\Lambda_{IC,i}(b_k) = \beta_{IC,i} \left[ \min_{a \in A_{k,i}^0} \left| \frac{\hat{x}_{IC,i}}{\gamma_{IC,i}} - a_i \right|^2 - \min_{a \in A_{k,i}^1} \left| \frac{\hat{x}_{IC,i}}{\gamma_{IC,i}} - a_i \right|^2 \right]; \quad \text{[Equation 3]}$$

$$\text{where } \hat{x}_{IC,i} \triangleq \frac{h_i^T (r - h_j \bar{a}_j)}{(h_i^T h_i + \sigma_n^2)}, \ j \neq i \ \forall \ i, \ j = 1 \text{ or } 2$$

$$\gamma_{IC,i} \triangleq \frac{h_i^T h_i}{(h_i^T h_i + \sigma_n^2)};$$

$$\beta_{IC,i} \triangleq \frac{\gamma_{IC,i}}{1 - \gamma_{IC,i}}.$$

According to an aspect, if all of the channels have similar channel gains, a soft demapping apparatus may perform non-linear interference cancellation using a PIC described above with Table 3.

Even though the zero signal forcing equalizer is used in Table 3, both signals may obtain LLR according to Equation 3 in the case of using U-MMSE.

According to various examples herein, there is provided a soft demapping algorithm that may use a relatively small amount of calculations and decrease a BER.

According to various examples herein, a preprocessing unit for 1D LLR value calculation may be used in order to decrease an amount of calculations that are used to calculate a 2D LLR value from a rotated QAM signal.

According to various examples herein, a preprocessing unit may use various types of interference cancellation schemes in order to further obtain a diversity.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for soft demapping, the apparatus comprising:
   a receiver configured to receive a rotated quadrature amplitude modulation (QAM) signal corresponding to a signal that is modulated to an in-phase (I) signal received via an I channel and a quadrature (Q) signal received via a Q channel;
   at least one interference cancellation unit configured to cancel interference that is included in the rotated QAM signal, through an equalization process and a de-rotation process;
   a determining unit configured to
     determine a signal that has a channel gain above a threshold between signals of the I channel and the Q channel, and
     select one of the at least one interference cancellation unit based on the channel gains with respect to the I channel and the Q channel; and
   a demapping processing unit configured to perform one-dimensional (1D) soft demapping of the interference-cancelled QAM signal.

2. The apparatus of claim 1, wherein the demapping processing unit is configured to calculate a log likelihood ratio (LLR) using one dimension, based on the interference-cancelled rotated QAM signal and a signal to interference plus noise ratio of the interference-cancelled rotated QAM signal.

3. The apparatus of claim 1, wherein the modulated I signal and Q signal are mapped using a constellation having at least one data bit, and are rotated or tilted at a predetermined angle.

4. The apparatus of claim 3, wherein the receiver is configured to compensate for the I channel and the Q channel using estimated channel information.

5. The apparatus of claim 1, wherein:
   the interference cancellation unit is configured to perform linear interference cancellation for the both received I and Q signals, and to perform non-linear interference cancellation by determining a transmission symbol of the linear interference-cancelled signal with respect to the signal having the channel gain above the threshold and by removing the determined transmission symbol from a received signal with respect to the signal having a lower channel gain.

6. The apparatus of claim 1, wherein the threshold corresponds to a reference value that is used to determine reliability of each of the I channel and the Q channel.

7. The apparatus of claim 1, wherein:
   the selected interference cancellation unit is configured to perform linear interference cancellation with respect to a signal of the channel having the channel gain above the threshold, and to perform non-linear interference cancellation with respect to a signal of a channel having a channel gain below the threshold by determining a transmission symbol of the linear interference-cancelled signal and by removing the determined transmission symbol from a received symbol, and
   the demapping processing unit is configured to perform 1D demapping of the interference cancelled rotated QAM signal using the channel having the channel gain above the threshold.

8. The apparatus of claim 1, wherein, in response to the channel gain of the I channel and the channel gain of the Q channel both being above the threshold or both being below the threshold, the selected interference cancellation unit is configured to cancel interference in the received rotated QAM signal using a linear interference cancellation unit.

9. The apparatus of claim 1, wherein, in response to both the channel gain of the I channel and the channel gain of the Q channel being above the threshold or being below the threshold, the selected interference cancellation unit is configured to cancel primary interference in the received rotated QAM signal using a linear interference cancellation unit, and to cancel secondary interference in the primary interference-cancelled rotated QAM signal using a non-linear interference cancellation unit, and
   the demapping processing unit is configured to perform 1D demapping of the secondary interference-cancelled QAM signal.

10. The apparatus of claim 1, wherein, in response to both the channel gain of the I channel and the channel gain of the Q channel having a value within the same range, the selected interference cancellation unit is configured to cancel interference in the received rotated QAM signal using each of a linear interference cancellation unit and a non-linear interference cancellation unit, and
    the demapping processing unit is configured to perform 1D demapping of the interference-cancelled QAM signal using each of the linear interference cancellation unit and the non-linear interference cancellation unit, through linear combination.

11. A method for soft demapping, the method comprising:
receiving a rotated quadrature amplitude modulation (QAM) signal corresponding to a signal that is modulated to an in-phase (I) signal received via an I channel and a quadrature (Q) signal received via a Q channel;
determining a signal having a channel gain above a threshold between signals of the I channel and the Q channel;
selecting one of at least one interference cancellation unit based on the channel gains with respect to the I channel and the Q channel;
cancelling interference included in the rotated QAM signal using the selected at least one interference cancellation unit, through an equalization process and a de-rotation process; and
performing one-dimensional (1D) soft demapping on the interference cancelled QAM signal.

12. The method of claim 11, wherein the performing comprises calculating a log likelihood ratio (LLR) using one dimension, based on the interference-cancelled QAM signal and a signal to interference plus noise ratio of the interference-cancelled QAM signal.

13. The method of claim 11, wherein the modulated I signal and Q signal are mapped using a constellation having at least one data bit, and are rotated or tilted at a predetermined angle.

14. A non-transitory computer-readable storage medium comprising a program for instructing a computer to perform a method for soft demapping, the method comprising:
receiving a rotated quadrature amplitude modulation (QAM) signal corresponding to a signal that is modulated to an in-phase (I) signal received via an I channel and a quadrature (Q) signal received via a Q channel;
determining a signal having a channel gain above a threshold between signals of the I channel and the Q channel;
selecting one of at least one interference cancellation unit based on the channel gains with respect to the I channel and the Q channel;
cancelling interference included in the rotated QAM signal using the selected at least one interference cancellation unit, through an equalization process and a de-rotation process; and
performing one-dimensional (1D) soft demapping on the interference-cancelled QAM signal.

15. An apparatus for soft demapping, the apparatus comprising:
a receiver configured to receive a rotated quadrature amplitude modulation (QAM) signal corresponding to a signal that is modulated to an in-phase (I) signal received via an I channel and a quadrature (Q) signal received via a Q channel;
a determining unit configured to determine a signal that has a channel gain above a threshold between signals of the I channel and the Q channel;
at least one interference cancellation unit configured to cancel interference that is included in the rotated QAM signal, through an equalization process and a de-rotation process comprising
performing linear interference cancellation for both of the received I and Q signals, and
performing non-linear interference cancellation by determining a transmission symbol of the linear interference-cancelled signal with respect to the signal having the channel gain above the threshold and by removing the determined transmission symbol from a received signal with respect to the signal having a lower channel gain;
a demapping processing unit configured to perform one-dimensional (1D) soft demapping of the interference-cancelled QAM signal.

* * * * *